(12) United States Patent
Bhatia et al.

(10) Patent No.: US 8,560,454 B1
(45) Date of Patent: Oct. 15, 2013

(54) SYSTEMS AND METHODS FOR PROVIDING USERS WITH CUSTOMIZED RENEWAL POLICIES

(75) Inventors: Yadvinder Bhatia, Punjab (IN); Anand Sankruthi, Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/419,343

(22) Filed: Mar. 13, 2012

(51) Int. Cl.
*G06F 21/00* (2013.01)
*G06Q 20/00* (2012.01)

(52) U.S. Cl.
USPC ............... 705/59; 705/16; 705/21; 380/262; 380/278; 380/279

(58) Field of Classification Search
USPC ............ 705/59, 16, 21, 71; 380/44, 262, 278, 380/279
See application file for complete search history.

(56) References Cited

U.S. PATENT DOCUMENTS

2007/0037114 A1* 2/2007 Wang .............................. 433/29
2011/0093914 A1* 4/2011 Jacobson ......................... 726/1

* cited by examiner

*Primary Examiner* — Dante Ravetti
(74) *Attorney, Agent, or Firm* — ALG Intellectual Property, LLC (57) ABSTRACT

A computer-implemented method for providing users with customized renewal policies may include 1) determining that a license for a software product installed on a user's computing system has expired or will expire within a predetermined amount of time, 2) in response to determining that the license for the software product has expired or will expire, monitoring, via a local module installed on the computing system, computing activities of the user, 3) evaluating the user's computing activities to determine that the user is investigating a competitor's software product that is capable of performing one or more functions performed by the installed software product, 4) creating, based on the user's investigation of the competitor's software product, a customized renewal policy for renewing the license to the installed software product, 5) inviting the user to renew the license under the customized renewal policy.

20 Claims, 5 Drawing Sheets

SYSTEMS AND METHODS FOR PROVIDING USERS WITH CUSTOMIZED RENEWAL POLICIES

BACKGROUND

When a license for an installed software product expires or is about to expire, a customer who is unsatisfied with a feature and/or price of the installed software product may evaluate alternative products and ultimately switch to an alternative product instead of renewing the license for the installed software product. To keep customers from switching to a competitor's product, a software product vendor may attempt to identify and reach out to dissatisfied customers by conducting customer satisfaction surveys. However, customer satisfaction surveys may not be effective in identifying dissatisfied customer for a variety of reasons. For example, many customers are unwilling to spend the time and effort required to complete a survey. What is needed, therefore, is a more efficient and effective mechanism for software vendors to identify and reach out to customers who may be considering switching to a competitor's product.

SUMMARY

As will be described in greater detail below, the instant disclosure generally relates to systems and methods for providing users with customized renewal policies.

In one example, a computer-implemented method for providing users with customized renewal policies may include 1) determining that a license for a software product installed on a user's computing system has expired or will expire within a predetermined amount of time, 2) in response to determining that the license for the software product has expired or will expire, monitoring, via a local module installed on the computing system, computing activities of the user, 3) evaluating the user's computing activities to determine that the user is investigating a competitor's software product that is capable of performing one or more functions performed by the installed software product, 4) creating, based on the user's investigation of the competitor's software product, a customized renewal policy for renewing the license to the installed software product, and 5) inviting the user to renew the license under the customized renewal policy.

In some embodiments, evaluating the user's computing activities may be performed at the local module such that a log of the user's computing activities is not transmitted outside the user's computing system. In such embodiments, evaluating the user's computing activities may include analyzing the user's computing activities to categorize the user, and creating the customized renewal policy may include 1) transmitting the categorization of the user to a remote licensing server, 2) at the remote licensing server, creating the customized renewal policy based on the categorization of the user, and 3) transmitting the customized renewal policy to the user's computing system.

According to various embodiments, evaluating the user's computing activities may include analyzing the user's computing activities to categorize the user. In such embodiments, creating the customized renewal policy may include downloading a set of customized renewal policies from a remote licensing server and, at the local module, using the categorization of the user to select the customized renewal policy from the set of customized renewal policies.

In some embodiments, creating the customized renewal policy may be based on the computing activities of the user and at least one of a geographical region where the user is located and/or a recent license renewal trend of users of the software product. In various embodiments, monitoring the computing activities of the user may include at least one of monitoring internet browsing activities of the user, monitoring social networking activities of the user, and/or monitoring electronic communication activities of the user. According to certain embodiments, creating the customized renewal policy may include identifying pricing of the competitor's software product and selecting pricing for the license such that the license is cheaper than the pricing of the competitor's software product.

In one embodiment, a system for implementing the above-described method may include 1) a determination module programmed to determine that a license for a software product installed on a user's computing device has expired or will expire within a predetermined amount of time, 2) a monitoring module programmed to, in response to determining that the license for the software product has expired or will expire, monitor, via a local module installed on the computing device, computing activities of the user, 3) an evaluation module programmed to evaluate the user's computing activities to determine that the user is investigating a competitor's software product that is capable of performing one or more functions performed by the installed software product, 4) a policy module programmed to create, based on the user's investigation of the competitor's software product, a customized renewal policy for renewing the license to the installed software product, and 5) a renewal module programmed to invite the user to renew the license under the customized renewal policy.

In some examples, the above-described method may be encoded as computer-readable instructions on a non-transitory computer-readable-storage medium. For example, a non-transitory computer-readable medium may include one or more computer-executable instructions that, when executed by at least one processor of a computing device, may cause the computing device to 1) determine that a license for a software product installed on a user's computing system has expired or will expire within a predetermined amount of time, 2) in response to determining that the license for the software product has expired or will expire, monitor, via a local module installed on the computing system, computing activities of the user, 3) evaluate the user's computing activities to determine that the user is investigating a competitor's software product that is capable of performing one or more functions performed by the installed software product, 4) create, based on the user's investigation of the competitor's software product, a customized renewal policy for renewing the license to the installed software product, and 5) invite the user to renew the license under the customized renewal policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may facilitate customer retention by providing customers with customized renewal policies. For example, the systems and methods described herein may identify customers who are investigating competitors' products and may create renewal policies with customized terms and/or pricing for such customers. Embodiments of the instant disclosure may also provide many other features and advantages, as will be discussed in greater detail below.

Figure 1:
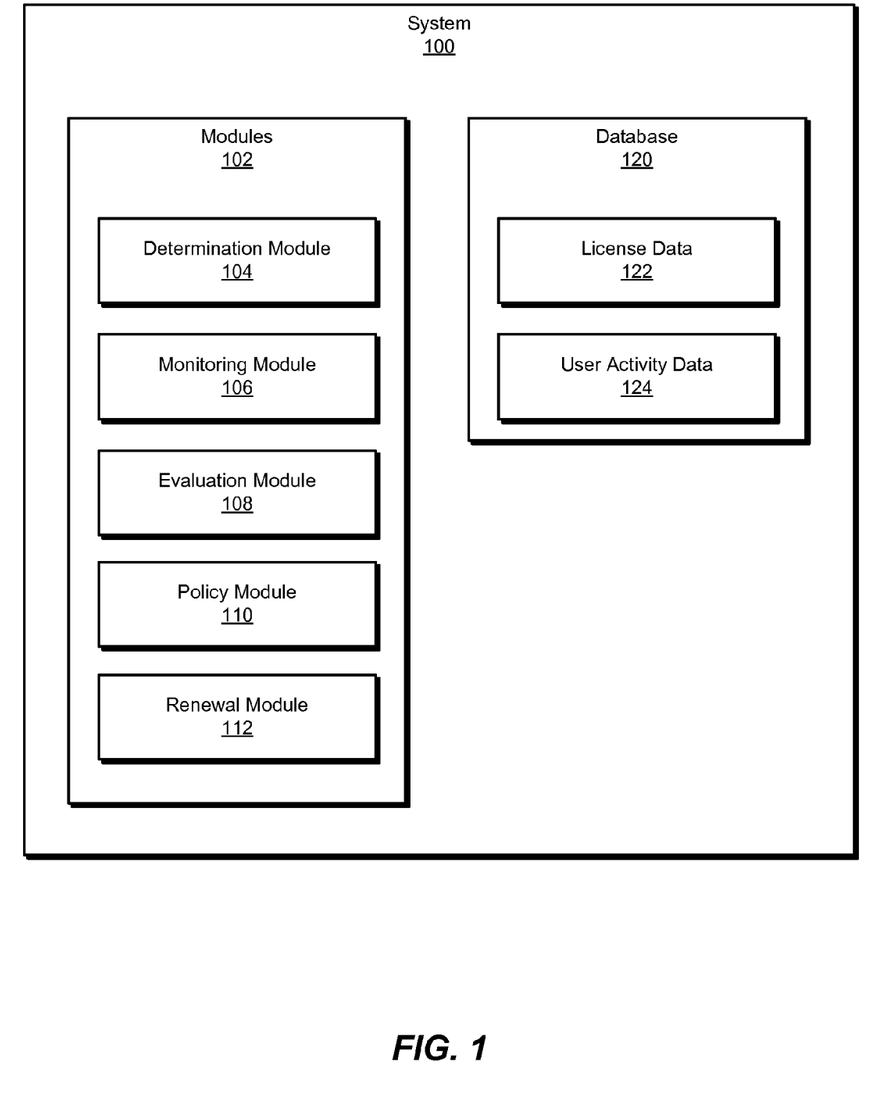
FIG. 1 is a block diagram of an exemplary system for providing users with customized renewal policies.
Figure 2:
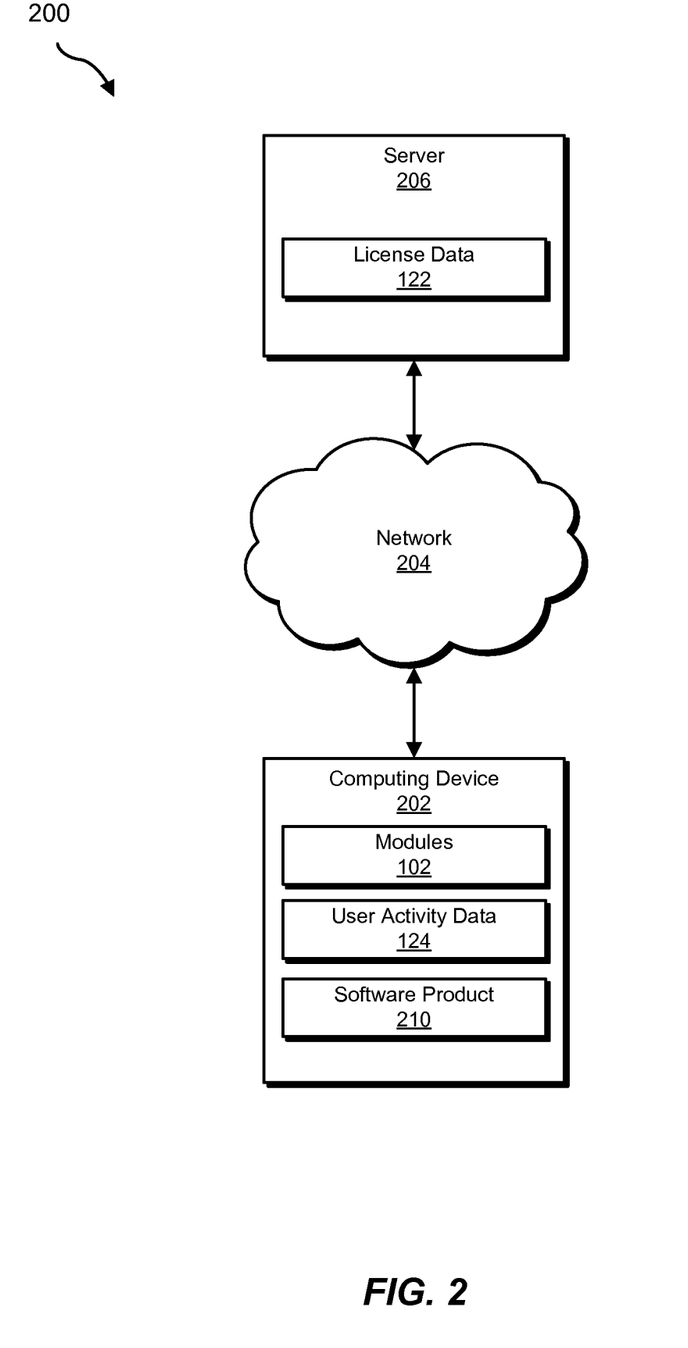
FIG. 2 is a block diagram of an exemplary system for providing users with customized renewal policies.

The following will provide, with reference to FIGS. 1-2, detailed descriptions of exemplary systems for providing users with customized renewal policies. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for providing users with customized renewal policies. As illustrated in this figure, exemplary system 100 may include one or more modules 102 for performing one or more tasks. For example, and as will be explained in greater detail below, exemplary system 100 may include a determination module 104 programmed to determine that a license for a software product installed on a user's computing device has expired or will expire within a predetermined amount of time. Exemplary system 100 may also include a monitoring module 106 programmed to, in response to determining that the license for the software product has expired or will expire, monitor, via a local module installed on the computing device, computing activities of the user In addition, and as will be described in greater detail below, exemplary system 100 may include an evaluation module 108 programmed to evaluate the user's computing activities to determine that the user is investigating a competitor's software product that is capable of performing one or more functions performed by the installed software product. Exemplary system 100 may also include a policy module 110 programmed to create, based on the user's investigation of the competitor's software product, a customized renewal policy for renewing the license to the installed software product.

Exemplary system 100 may further include a renewal module 112 programmed to invite the user to renew the license under the customized renewal policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store license data 122 for one or more customers and/or one or more renewal policies. Database 120 may also store user activity data 124, which may include information about a user's investigation into competitors' products.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a computing device 202 in communication with a server 206 via a network 204.

In one embodiment, one or more of modules 102 from FIG. 1 may, when executed by at least one processor of computing device 202, enable computing device 202 to providing users with customized renewal policies. For example, and as will be described in greater detail below, one or more of modules 102 may cause computing device 202 to 1) determine that a license for a software product installed on a user's computing system has expired or will expire within a predetermined amount of time, 2) in response to determining that the license for the software product has expired or will expire, monitor, via a local module installed on the computing system, computing activities of the user, 3) evaluate the user's computing activities to determine that the user is investigating a competitor's software product that is capable of performing one or more functions performed by the installed software product, 4) create, based on the user's investigation of the competitor's software product, a customized renewal policy for renewing the license to the installed software product, and 5) invite the user to renew the license under the customized renewal policy.

As shown in FIG. 2, computing device 202 may store user activity data 124 and a software product 210. As used herein, the phrase "software product" generally refers to any type or form of computer executable code, software application, software module, software package, and/or other software system that may be sold and/or licensed to users for installation on the users' devices.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Server 206 generally represents any type or form of computing device that is capable of maintaining license data 122 and/or creating customized renewal policies for software products. Examples of server 206 include, without limitation, application servers and database servers configured to provide various database services and/or run certain software applications. For example, server 206 may be a licensing server of a software product vendor.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
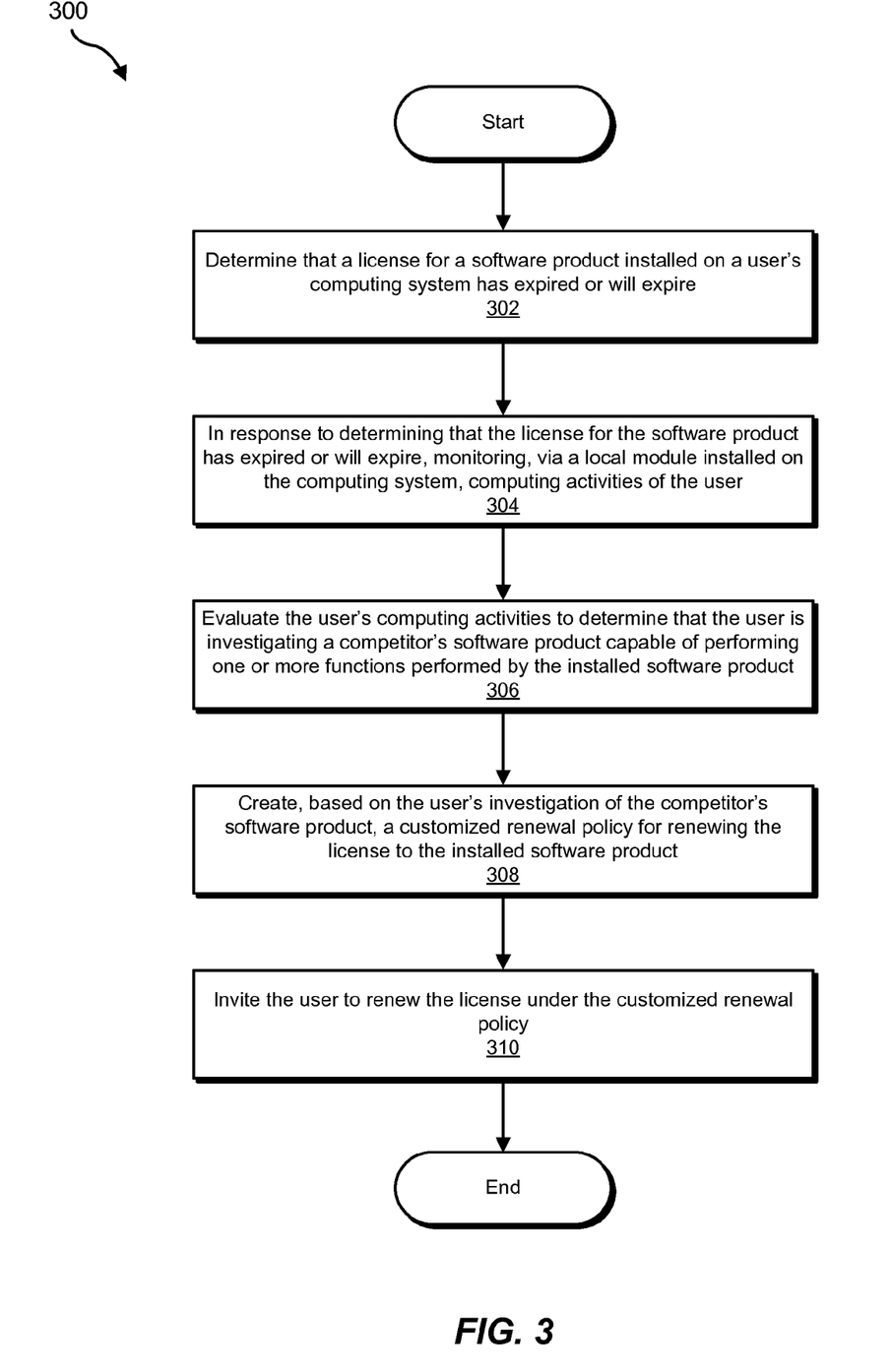
FIG. 3 is a flow diagram of an exemplary method for providing users with customized renewal policies.

FIG. 3 is a flow diagram of an exemplary computer-implemented method 300 for providing users with customized renewal policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

At step 302 in FIG. 3, one or more of the systems described herein may determine that a license for a software product installed on a user's computing system has expired or will expire within a predetermined amount of time. For example, determination module 104 in FIG. 1 (which may, as detailed above, represent a portion of computing device 202 in FIG. 2) determine that a license for software product 210 on computing device 202 has expired or will expire within a predetermined amount of time.

As used herein, the term "license" generally refers to any agreement between a developer or vendor of a software product (i.e., licensor of a software product) and a consumer or user of the software product (i.e., licensee of the software product). A licensor may be any developer, vendor, and/or other enterprise that owns and sells licenses for a software product. A licensee may be any individual, company, or other entity that is granted the right to use the software product. Examples of licenses between licensors and licensees include temporary licenses (e.g., a short-term trial license), periodically renewable licenses (e.g., annually renewable licenses, monthly renewable licenses, etc.), and/or any other type or form of license agreement.

Determination module 104 may determine that a license for a software product has expired or will expire in a variety of contexts and manners. For example, determination module 104 may determine that a license has expired by tracking an expiration date of software product 210, by querying a database (e.g., license data 122) that tracks license dates for software product 210, by receiving a message indicating that the license has expired, and/or any other suitable manner. Determination module 104 may determine that a license for software product 210 will expire by tracking an expiration date of software product 210, by querying a database (e.g., license data 122) that tracks license dates for software product 210, by receiving a message indicating that the license will expire in a predetermined amount of time, and/or may detect imminent expiration of the license and any other suitable manner. Determination module 104 may detect that the license for the software product may expire in one day, in one week, in one month, in 45 days, and/or within any other amount of time.

At step 304 in FIG. 3, one or more of the systems described herein may, in response to determining that the license for the software product has expired or will expire, monitor, via a local module installed on the computing system, computing activities of the user. As used herein, the term local module may refer to one or more, or any portion of, modules 102 in FIG. 1. For example, monitoring module 106 may, in response to the determination that the license for the software product has expired or will expire, monitor computing activities of a user of computing device 202.

Monitoring module 106 may monitor one or more of a variety of computing activities of a user. For example, monitoring module 106 may monitor Internet browsing activities of a user. Monitoring module 106 may additionally or alternatively monitor social networking activities of the user, e-mail activities of the user, instant messaging activities of the user, input to the user's computing device (e.g., via a keyboard), and/or any other activities of a user of computing device 202.

As noted, monitoring module 106 may monitor computing activities of a user in response to determining that the license for the software product has expired or will expire. For example, once license expiration is imminent or the license has already expired, monitoring module 106 may be triggered to start monitoring computing activities of the user.

At step 306 in FIG. 3, one or more of the systems described herein may evaluate the user's computing activities to determine that the user is investigating a competitor's software product that is capable of performing one or more functions performed by the installed software product. For example, evaluation module 108 in FIG. 1 (which may, as detailed above, represent a portion of computing device 202 in FIG. 2) may evaluate the user's computing activities to determine that the user is investigating a software product is capable of performing one or more functions performed by installed software product 210.

Evaluation module 108 may evaluate a user's computing activities in any suitable manner. Evaluation module 108 may evaluate the user's computing activities by searching the user's computing activities for any information indicating that the user is investigating one or more competitor's products. For example, evaluation module 108 may search websites visited by the user, text entered by the user into a website, an e-mail, social networking site, and/or otherwise into a computing system, and/or may analyze any other resource of a computing system for keywords associated with competitors' products. In some embodiments, evaluation module 108 may search a user's computing activities for names of competitors' products, names of competitors' companies, for keywords indicating functionality of competitors' products, and/or for any other information that indicates the user is investigating competitors' products.

In evaluating the user's computing activities, evaluation module 108 may determine the types of replacement products the user is searching for, may determine how diligently and the user is searching for an alternative product (e.g., how many competitors' products the user has researched, how much time the user has spent researching competitors' products, which competitors' products the user has researched, whether the user has been in contact with representatives of a competitor's product via chat, email, or social networking, etc.), may identify price points of competitors' products that the user is researching, may determine which features and/or functionalities are most important to the user, and/or may draw any other conclusions about the user based on the user's computing activities.

In some embodiments, evaluation module 108 may search the user's activities only for products that are capable of performing one or more functions performed by the installed software product. In other words, evaluation module 108 may evaluate a user's computing activities to identify whether the user is investigating a product that can perform at least one function of software product 210. For example, evaluation module 108 may search the user's activities for terms identified in a predefined list of products from competitors that perform the functionality of software product 210, by searching for keywords associated with one or more functionalities a software product 210, and/or in any other suitable manner.

In some embodiments, evaluation module 108 may evaluate a user's computing activities to characterize the user. For example, evaluation module 108 may characterize a user who is actively searching competitors' products (e.g., a user who has viewed two or more competitors' products, a user who has searched for competitors' products two or more times, a user who frequently views competitors' websites, etc.) as "actively searching." Evaluation module 108 may characterize a user who is casually searching competitors' products (e.g., a user who has only viewed a single competitor's product, a user who infrequently searches—less than once a week—for competitors' products, etc.) as "casually searching." Evaluation module 108 may characterize users into any other suitable categories, and in some embodiments may select from one or more predefined categories to categorize users.

Evaluation module 108 may transmit a characterization of a user to a remote system (e.g., server 206) without compromising privacy of the user (e.g., without sending logs of the user's activities or other sensitive information about the user to a remote system). At server 206, a customized renewal policy may be created based on the categorization of the user, and server 206 may transmit the customized renewal policy to computing device 202. Additionally or alternatively, evaluation module 108 may evaluate a user's computing activities locally on computing device 202 such that any log and/or other information associated with the user's computing activities is not transmitted outside the user's computing system.

At step 308 in FIG. 3, one or more of the systems described herein may create, based on the user's investigation of a competitor's software product, a customized renewal policy for renewing the license to the installed software product. For example, policy module 110 in FIG. 1 (which may, as detailed above, represent a portion of computing device 202 in FIG. 2) may create, based on the user's investigation of the competitor's software product, a customized renewal policy for renewing the license to the installed software product.

Policy module 110 may customize any portion of a renewal policy based on a user's investigation of a competitor's software product. For example, policy module 110 may customize pricing, terms, and/or any other terms of a customized renewal policy. As used herein, the phrase "customized renewal policy" generally refers to any policy customized for a user for renewing a license to an installed software product.

Policy module 110 may create a customized renewal policy in one or more of a variety of manners. For example, policy module 110 may create a customized renewal policy by identifying pricing of one or more competitor's software products and selecting pricing for the customized renewal policy such that the customized renewal policy is cheaper than pricing of the competitor's software product.

In some embodiments, policy module 110 may create the customized renewal policy by basing the customized renewal policy on a geographical location where the user is located. In such embodiments, policy module 110 may identify other users' habits and/or users' license prices from the geographical region where the user is located to price and/or otherwise configure the customized renewal policy for the user. Policy module 110 may additionally or alternatively evaluate recent license renewal trends of users for the software product and may create a customized renewal policy in line with such trends. For example, policy module 110 may determine that within the past month, users have been more comfortable with shorter licensing terms with slightly higher fees, and policy module 110 may therefore create a customized renewal policy consistent with this trend by creating a customized renewal policy that has a slightly higher fee but shorter term. Policy module 110 may create the customized renewal policy locally (e.g., at computing device 202) or remotely (e.g., at server 206.).

At step 310 in FIG. 3, one or more of the systems described herein may invite the user to renew the license under the customized renewal policy. For example, renewal module 112 in FIG. 1 (which may, as detailed above, be part of computing device 202 in FIG. 2) may invite the user to renew the license under the customized renewal policy. Renewal module 112 may invite the user to renew the license under the customized renewal policy in any suitable manner. For example, renewal module 112 may present the customized renewal policy to the user by sending the customized renewal policy the user via e-mail, via a pop-up message, via a text message, and/or in any other suitable manner. In some embodiments, renewal module 112 may also present the user with a comparison to the competitor's software products and highlight why the installed software product is better than, cheaper than, and/or has any other advantage over the competitor's product. Additionally or alternatively, renewal module 112 may, when inviting the user to renew the license under the customized renewal policy, emphasize terms of the policy and/or the software product that the user showed particular interest in (e.g., in view of the user's computing activities).

Figure 4:
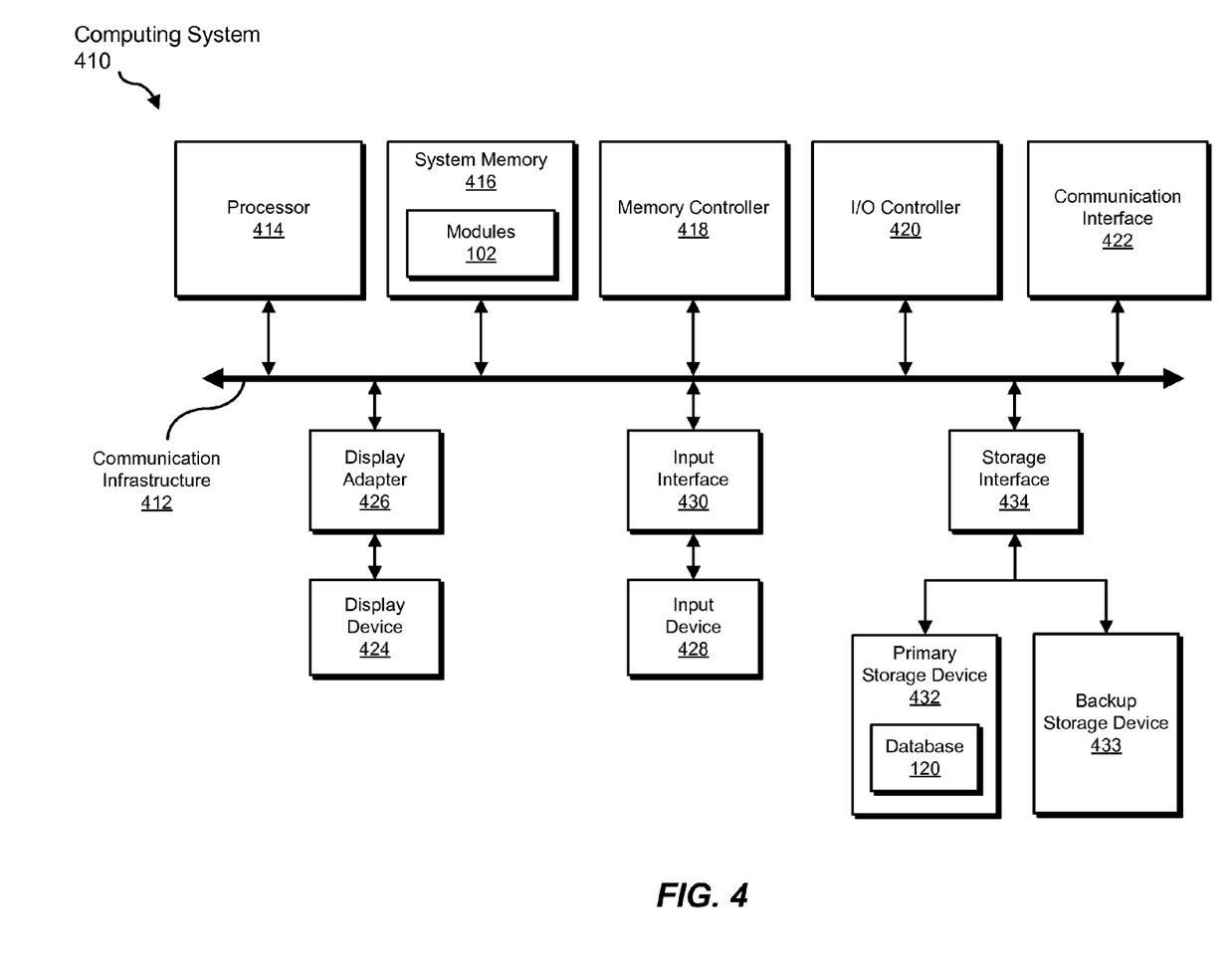
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the determining, monitoring, evaluating, creating, inviting, transmitting, downloading, using, selecting, and/or identifying steps described herein. All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
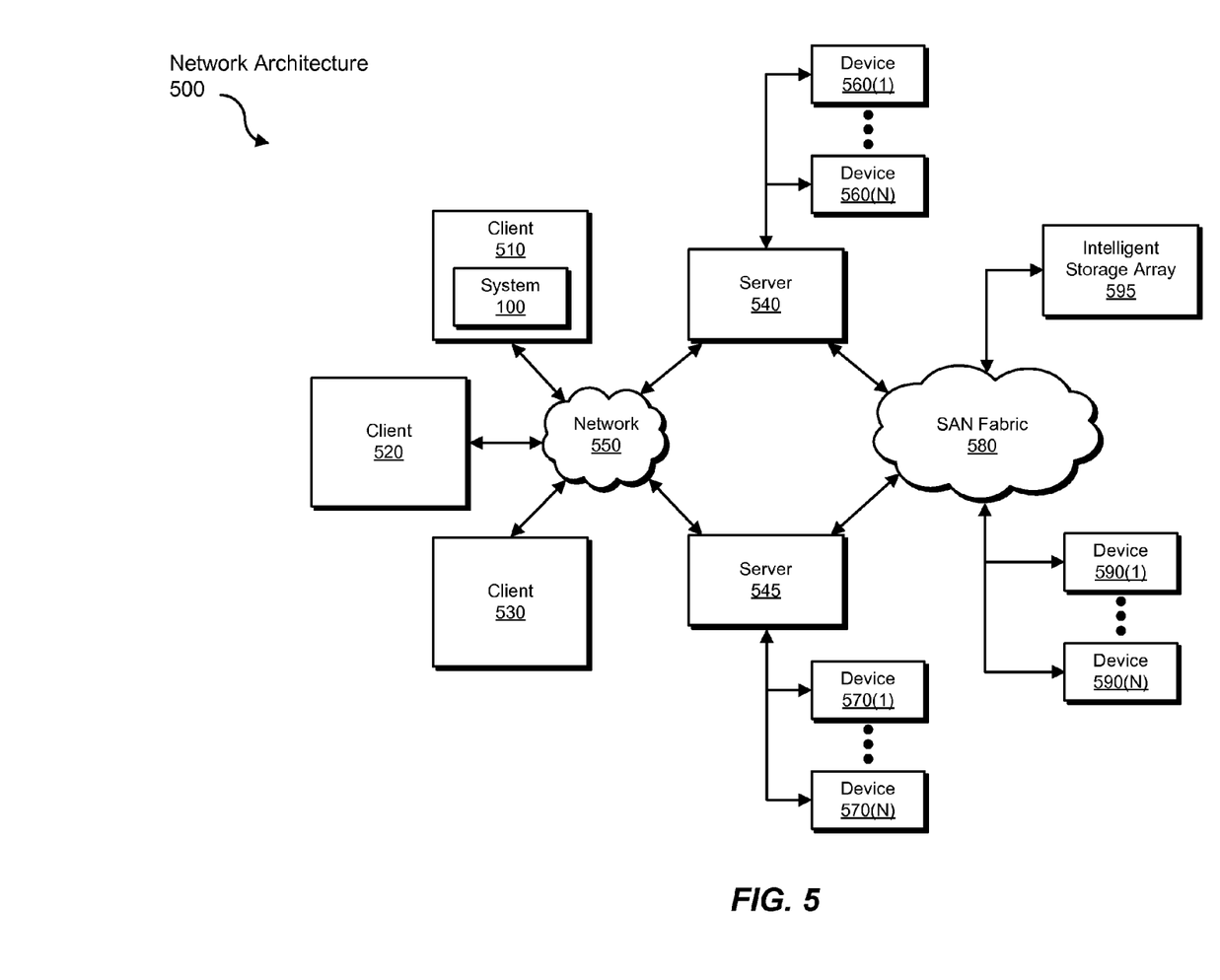
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the determining, monitoring, evaluating, creating, inviting, transmitting, downloading, using, selecting, and/or identifying steps disclosed herein. All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for providing users with customized renewal policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a storage device comprising a license agreement by customizing the license agreement.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing users with customized renewal policies, at least a portion of the method being performed by at least one processor, the method comprising:

determining, by a user's computing system or a remote licensing server, that a license for a first software product providing by a first entity and installed on the user's computing system has expired or will expire within a predetermined amount of time;

monitoring, by the user's computing system, computing activities of the user in response to the determination that the license for the first software product has expired or will expire;

evaluating, by the user's computing system or the remote licensing server, the user's computing activities by searching the user's computing activities for information indicating that the user is investigating a second software product providing by a second entity that performs one or more functions performed by the first software product;

determining, by the user's computing system or the remote licensing server, that the user is investigating the second software product based on the evaluation of the user's computing activities;

creating, by the user's computing system or the remote licensing server, a customized renewal policy for renewing the license to the first software product based on the user's investigation of the second software product;

inviting, by the user's computing system or the remote licensing server, the user to renew the license under the customized renewal policy.

2. The computer-implemented method of claim 1, wherein:
monitoring the user's computing activities is performed at a local module installed on the user's computing system;
evaluating the user's computing activities is performed at the local module installed on the user's computing system such that a log of the user's computing activities is not transmitted outside the user's computing system.

3. The computer-implemented method of claim 2, wherein:
evaluating the user's computing activities comprises analyzing the user's computing activities to categorize the user;
creating the customized renewal policy comprises:
transmitting the categorization of the user from the user's computing system to the remote licensing server;
at the remote licensing server, creating the customized renewal policy based on the categorization of the user;
transmitting the customized renewal policy from the remote licensing server to the user's computing system.

4. The computer-implemented method of claim 2, wherein:
evaluating the user's computing activities comprises analyzing the user's computing activities to categorize the user;
creating the customized renewal policy comprises:
downloading a set of customized renewal policies from the remote licensing server;
at the local module, using the categorization of the user to select the customized renewal policy from the set of customized renewal policies.

5. The computer-implemented method of claim 1, wherein creating the customized renewal policy is based on the computing activities of the user and at least one of:
a geographical region where the user is located;
a recent license renewal trend of users of the first software product.

6. The computer-implemented method of claim 1, wherein monitoring the computing activities of the user comprises at least one of:
monitoring internet browsing activities of the user;
monitoring social networking activities of the user;
monitoring electronic communication activities of the user.

7. The computer-implemented method of claim 1, wherein creating the customized renewal policy comprises:

identifying pricing of the second software product;
selecting pricing for the license such that the license is cheaper than the pricing of the second software product.

8. A system for Error! Reference source not found, the system comprising:
at least one hardware processor;
a determination module programmed to determine that a license for a first software product provided by a first entity and installed on a user's computing device has expired or will expire within a predetermined amount of time;
a monitoring module programmed to, in response to the determination that the license for the first software product has expired or will expire, monitor, via a local module installed on the computing device, computing activities of the user;
an evaluation module programmed to:
evaluate the user's computing activities by searching the user's computing activities for information indicating that the user is investigating a second software product providing by a second entity that performs one or more functions performed by the first software product;
determine that the user is investigating the second software product based on the evaluation of the user's computing activities;
a policy module programmed to create, based on the user's investigation of the second software product, a customized renewal policy for renewing the license to the first software product;
a renewal module programmed to invite the user to renew the license under the customized renewal policy;
wherein the hardware processor is used to execute the determination module, the monitoring module, the evaluation module, the policy module, and the renewal module.

9. The system of claim 8, wherein the evaluation module evaluates the user's computing activities locally such that a log of the user's computing activities is not transmitted outside the user's computing device.

10. The system of claim 9, wherein:
the evaluation module evaluates the user's computing activities by analyzing the user's computing activities to categorize the user;
the policy module creates the customized renewal policy by transmitting the categorization of the user to a remote licensing server;
a customization module at the remote licensing server creates the customized renewal policy based on the categorization of the user and transmits the customized renewal policy to the user's computing device.

11. The system of claim 9, wherein:
the evaluation module evaluates the user's computing activities by analyzing the user's computing activities to categorize the user;
the policy module creates the customized renewal policy by:
downloading a set of customized renewal policies from a remote licensing server;
using the categorization of the user to select the customized renewal policy from the set of customized renewal policies.

12. The system of claim 8, wherein the policy module creates the customized renewal policy based on the computing activities of the user and at least one of:
a geographical region where the user is located;
a recent license renewal trend of users of the first software product.

13. The system of claim 8, wherein the monitoring module is programmed to monitor the computing activities of the user by performing at least one of:
monitoring internet browsing activities of the user;
monitoring social networking activities of the user;
monitoring electronic communication activities of the user.

14. The system of claim 8, wherein the policy module is programmed to create the customized renewal policy by:
identifying pricing of the second software product;
selecting pricing for the license such that the license is cheaper than the pricing of the second software product.

15. A non-transitory computer-readable medium comprising one or more computer-executable instructions that, when executed by at least one processor of a computing device, cause the computing device to perform the steps of:
determining that a license for a first software product provided by a first entity and installed on a user's computing system has expired or will expire within a predetermined amount of time;
based on the determining that the license for the first software product has expired or will expire, monitoring, via a local module installed on the computing system, computing activities of the user;
evaluating the user's computing activities by searching the user's computing activities for information indicating that the user is investigating a second software product provided by a second entity that performs one or more functions performed by the first software product;
determining that the user is investigating the second software product based on the evaluation of the user's computing activities;
creating, based on the user's investigation of the second software product, a customized renewal policy for renewing the license to the first software product;
inviting the user to renew the license under the customized renewal policy.

16. The non-transitory computer-readable medium of claim 15, wherein the one or more computer-executable instructions are programmed to, when executed by the at least one processor of the computing device, cause the computing device to perform the step of:
evaluating the user's computing activities locally such that a log of the user's computing activities is not transmitted outside the user's computing system.

17. The non-transitory computer-readable medium of claim 16, wherein the one or more computer-executable instructions are programmed to, when executed by the at least one processor of the computing device, cause the computing device to perform the steps of:
evaluating the user's computing activities by analyzing the user's computing activities to categorize the user;
creating the customized renewal policy by:
transmitting the categorization of the user to a remote licensing server;
at the remote licensing server, creating the customized renewal policy based on the categorization of the user;
transmitting the customized renewal policy to the user's computing system.

18. The non-transitory computer-readable medium of claim 16, wherein the one or more computer-executable instructions are programmed to, when executed by the at least one processor of the computing device, cause the computing device to perform the steps of:

evaluating the user's computing activities by analyzing the user's computing activities to categorize the user;

creating the customized renewal policy by:
- downloading a set of customized renewal policies from a remote licensing server;
- at the local module, using the categorization of the user to select the customized renewal policy from the set of customized renewal policies.

19. The non-transitory computer-readable medium of claim 15, wherein creating the customized renewal policy is based on the computing activities of the user and at least one of:
- a geographical region where the user is located;
- a recent license renewal trend of users of the first software product.

20. The non-transitory computer-readable medium of claim 15, wherein the one or more computer-executable instructions are programmed to, when executed by the at least one processor of the computing device, cause the computing device to monitor the computing activities of the user by performing at least one of the steps of:
- monitoring internet browsing activities of the user;
- monitoring social networking activities of the user;
- monitoring electronic communication activities of the user.

* * * * *

UNITED STATES PATENT AND TRADEMARK OFFICE
CERTIFICATE OF CORRECTION

| | | |
|---|---|---|
| PATENT NO. | : 8,560,454 B1 | Page 1 of 1 |
| APPLICATION NO. | : 13/419343 | |
| DATED | : October 15, 2013 | |
| INVENTOR(S) | : Yadvinder Bhatia and Anand Sankruthi | |

It is certified that error appears in the above-identified patent and that said Letters Patent is hereby corrected as shown below:

In the Claims:

Claim 8, at column 15, lines 4 to 5, should read:

A system for providing users with customized renewal policies, the system comprising:

Signed and Sealed this
Twenty-fifth Day of February, 2014

Michelle K. Lee
*Deputy Director of the United States Patent and Trademark Office*